United States Patent
Yokoi et al.

(10) Patent No.: US 8,747,958 B2
(45) Date of Patent: Jun. 10, 2014

(54) ACTINIC RAY CURABLE INKJET INK COMPOSITION, PRINTED ARTICLE, SHAPED PRINTED PRODUCT, AND PRINTED ARTICLE FORMING METHOD

(75) Inventors: Kazuhiro Yokoi, Ashigarakami-gun (JP); Kenjiro Araki, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 104 days.

(21) Appl. No.: 13/183,038

(22) Filed: Jul. 14, 2011

(65) Prior Publication Data

US 2012/0028002 A1 Feb. 2, 2012

(30) Foreign Application Priority Data

Jul. 27, 2010 (JP) .................................. 2010-168529

(51) Int. Cl.
  *C09D 11/02* (2006.01)
  *C08F 2/46* (2006.01)
  *C08J 3/28* (2006.01)

(52) U.S. Cl.
  USPC .................. 427/511; 525/50; 522/2; 524/529

(58) Field of Classification Search
  None
  See application file for complete search history.

(56) References Cited

U.S. PATENT DOCUMENTS

| 6,620,887 | B2 * | 9/2003 | Fujimoto et al. ............... 525/193 |
| 7,713,462 | B2 * | 5/2010 | Hayata et al. .................. 264/447 |
| 2008/0075882 | A1 | 3/2008 | Hayata |
| 2008/0090931 | A1 | 4/2008 | Nagvekar et al. |
| 2009/0068418 | A1 | 3/2009 | Iwase et al. |
| 2009/0226675 | A1 | 9/2009 | Takahashi et al. |

FOREIGN PATENT DOCUMENTS

| EP | 1 371 700 A2 | 12/2003 |
| EP | 1 536 057 A1 | 6/2005 |
| EP | 1 571 187 A1 | 9/2005 |
| EP | 2 042 572 A1 | 4/2009 |
| EP | 2 088 175 A1 | 8/2009 |
| JP | 01247804 A | 9/2001 |
| JP | 2008-037879 A | 2/2008 |
| JP | 2008-105393 A | 5/2008 |
| JP | 200996043 A | 5/2009 |
| JP | 2010024450 A | 2/2010 |
| JP | 2010506966 A | 3/2010 |
| WO | 2007055332 A1 | 5/2007 |

OTHER PUBLICATIONS

Machine translation of JP 2006-274083 A.*
Communication, dated Nov. 30, 2011, issued in corresponding EP Application No. 11174449.6, 5 pages.
Japanese Office Action corresponding to Japanese Patent Application No. 2010-168529, dated Dec. 17, 2013, 6 pages in Japanese and English.

* cited by examiner

*Primary Examiner* — Vu A Nguyen
(74) *Attorney, Agent, or Firm* — Sughrue Mion, PLLC

(57) ABSTRACT

The present invention provides an actinic ray curable ink composition for inkjet recording, which has a high sensitivity for inhibiting a blocking phenomenon and capability for forming an image, obtained by curing, which exhibits excellent shaping suitability and punching suitability, and which includes: a colorant; a polymerization initiator; a polymerizable monomer; and organic fine particles, the polymerizable monomer containing a monofunctional monomer in an amount of 90% by mass or more with respect to a total mass of the polymerizable monomer, and organic fine particles that are crosslinked.

16 Claims, 1 Drawing Sheet

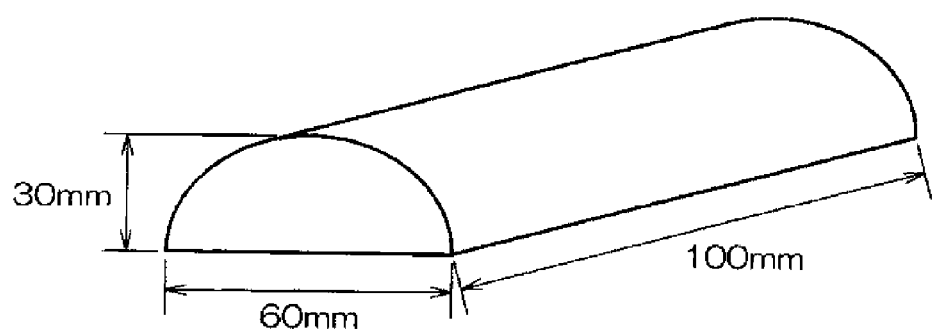

ACTINIC RAY CURABLE INKJET INK COMPOSITION, PRINTED ARTICLE, SHAPED PRINTED PRODUCT, AND PRINTED ARTICLE FORMING METHOD

CROSS-REFERENCE TO RELATED APPLICATION

This application claims priority under 35 USC 119 from Japanese Patent Application No. 2010-168529 filed on Jul. 27, 2010, the disclosure of which is incorporated by reference herein.

BACKGROUND OF THE INVENTION

1. Field of the Invention

The present invention relates to a new actinic ray curable inkjet ink composition, a printed article, a shaped printed product, and a printed article forming method.

2. Description of the Related Art

There are many image-recording methods for forming an image on a recording medium such as paper based on image data signals, including those by an electrophotographic process, a sublimation or fusion heat-transfer process, and an inkjet process. Among them, the inkjet process is advantageous in that it allows printing in a cheaper device, and because it forms an image directly on a recording medium by ejecting ink only in a required image region, and ink can be used efficiently, and a running cost is low.

According to the inkjet method, it is possible to print not only on regular paper but also on a non-absorptive recording medium such as a plastic sheet or a metal plate. However, increased speed at the time of printing and increased image quality are key issues, and it is a property of the inkjet method that the time required for drying and curing droplets after printing greatly affects the productivity of printed materials and the sharpness of printed images.

As one of the inkjet methods, there is a recording method using an inkjet recording ink that is curable by irradiation of radiation. According to this method, by curing ink droplets by irradiating radiation immediately after or after a fixed time after the ink is ejected, the productivity of printing can be increased, and sharp images can be formed.

However, in inkjet printing in which printing is performed in large amounts at high speed, printed recording media are stacked at an outlet in large amounts at high speed. In that case, when curing of printing ink is not sufficient, a phenomenon in which ink is transferred to another printed article in the stack (blocking) may occur. Accordingly, there is demand for inks that cure with higher sensitivity than conventional inks and suppress blocking (inks having favorable sensitivity for preventing blocking).

Meanwhile, when the printed article has insufficient flexibility or stretchability in a subsequent step of processing the same, cracking, white deletion or the like may occur in the obtained image surface during a process in which the printed article is slowly stretched and formed by heating.

Moreover, when the printed article has insufficient impact resistance against a quick impact due to cutting during a subsequent process of punching the printed article into formed products, cracks may be formed at a cut surface of the printed article or in the vicinity thereof. Inferior punching suitability of the printed article may damage its value as a commercial product.

From the viewpoint of producing a film that exhibits favorable adhesiveness, flexibility and strength, Japanese Patent Application Laid-Open (JP-A) No. 2008-37879 proposes an actinic ray curable composition including a photopolymerization initiator, a photopolymerizable compound and rubber fine particles.

From the viewpoint of achieving favorable forming processability, JP-A No. 2008-105393 proposes an ink composition including a monofunctional radical polymerizable monomer having only one unsaturated double bond group, such as a (meth)acrylate group, and at least one group having a cyclic structure.

SUMMARY OF THE INVENTION

According to an aspect of the invention, an actinic ray curable ink composition for inkjet recording including: a colorant; a polymerization initiator; a polymerizable monomer including a monofunctional monomer in an amount of 90% by mass or more with respect to a total mass of the polymerizable monomer; and organic fine particles that are crosslinked, a printed article, a shaped printed product, and a method for forming a printed article, are provided.

Problems to be Addressed by the Invention

However, although the above documents focus attention on the forming suitability of the printed film (image), neither of them focus attention on the punching suitability of the image, and no studies have been made on how to achieve these properties at the same time. Further, no studies have been made on the sensitivity with respect to curing ink and suppressing blocking.

In view of the foregoing, the invention aims to achieve the following goal.

Specifically, the invention aims to provide an ink composition that has a high sensitivity for inhibiting a blocking phenomenon, and capability for forming an image, obtained by curing, which exhibits excellent shaping suitability and punching suitability, and that is favorably used in inkjet recording; a printed article obtained by using the ink composition; a shaped printed product; and a printed article forming method.

Solution to Problem

Exemplary embodiments according to the aspect of the invention include, but are not limited to the following items <1> to <17>.

<1>. An actinic ray curable ink composition for inkjet recording including: a colorant; a polymerization initiator; a polymerizable monomer including a monofunctional monomer in an amount of 90% by mass or more with respect to a total mass of the polymerizable monomer; and organic fine particles that are crosslinked.

<2>. The ink composition according to the item <1>, wherein a solubility parameter of the organic fine particles is in a range of from 30 to 50 $(MPa)^{1/2}$.

<3>. The ink composition according to the item <1> or the item <2>, wherein the organic fine particles include at least one resin selected from the group consisting of an acrylic resin, an acrylic-styrene resin, an epoxy resin, a urethane resin and a polyamide resin.

<4>. The ink composition according to any one of the items <1> to <3>, wherein the organic fine particles have a volume average particle diameter in a range of from 0.01 μm to 3 μm.

<5>. The ink composition according to any one of the items <1> to <4>, wherein a content of the polymerizable monomer is 50% by mass or more with respect to a total mass of the ink composition.

<6>. The ink composition according to any one of the items <1> to <5>, wherein the polymerizable monomer includes a monofunctional monomer and a polyfunctional monomer, and a mass ratio of the monofunctional monomer to the polyfunctional monomer (monofunctional monomer:polyfunctional monomer) is in a range of from 90:10 to 99.9:0.1.

<7>. The ink composition according to any one of the items <1> to <6>, wherein the monofunctional monomer is a radical polymerizable monomer.

<8>. The ink composition according to the item <7>, wherein the radical polymerizable monomer includes an acrylate compound and a N-vinyl compound.

<9>. The ink composition according to the item <7> or the item <8>, wherein the radical polymerizable monomer includes an acrylate having a cyclic structure in a molecule thereof.

<10>. The ink composition according to any one of the items <1> to <9>, further including a chain transfer agent.

<11>. The ink composition according to the item <10>, wherein the chain transfer agent is a polyfunctional thiol compound having a secondary thiol group or a tertiary thiol group.

<12>. The ink composition according to any one of the items <1> to <11>, wherein a mass ratio of a mass of the ink composition before curing to a mass of an image obtained by curing the ink composition by actinic rays and drying (mass of the ink composition before curing:mass of the image obtained after curing) is in a range of from 100:95 to 100:100.

<13>. The ink composition according to any one of the items <1> to <12>, wherein a content of water is 3% by mass or less with respect to a total mass of the ink composition.

<14>. The ink composition according to any one of the items <1> to <13>, wherein the ink composition substantially contains no solvent other than the polymerizable monomer.

<15>. A printed article having an image formed by using the ink composition according to any one of the items <1> to <14>.

<16>. A shaped printed product formed by using the printed article according to the item <15>.

<17>. A method for forming a printed article including: an image forming process that forms an image by ejecting, onto a recording medium, the actinic ray curable ink composition for inkjet recording according to any one of the items <1> to <14>, and a cured image forming process that forms a printed article having a cured image on the recording medium by irradiation of the actinic ray onto the image so that the ink composition in the image is cured.

According to an exemplary embodiment of the invention, it is possible to provide an ink composition that has a high sensitivity for preventing blocking, exhibits excellent shaping suitability and punching suitability of an image obtained by curing an ink, and is favorably used in inkjet recording.

Further, according to another exemplary embodiment of the invention, it is possible to provide a printed article obtained by using the ink composition, a shaped printed product, and a printed article forming method.

BRIEF DESCRIPTION OF THE DRAWINGS

Exemplary embodiments of the invention will be described in detail based on the following FIGURE, wherein:

FIG. 1 is a schematic perspective view of a wooden mold positioned in a vacuum forming machine in a vacuum molding test of a printed article.

DETAILED DESCRIPTION OF THE INVENTION

1. Ink Composition

The actinic ray curable ink composition for inkjet recording (hereinafter, also simply referred to as "ink composition") includes a colorant, a polymerization initiator, a polymerizable monomer and organic fine particles, the polymerizable monomer containing a monofunctional monomer in an amount of 90% by mass or more with respect to a total mass of the polymerizable monomer, and the organic fine particles being crosslinked.

In the following, the components of the actinic ray curable ink composition for inkjet recording according to the invention will be explained in detail.

<Polymerizable Monomer>

The ink composition according to the exemplary embodiment of the invention includes a polymerizable monomer, and at least 90% by mass of the polymerizable monomer is a monofunctional monomer with respect to the total mass of the polymerizable monomer. By including at least 90% by mass of a monofunctional monomer, shaping suitability, punching suitability or the like of an image obtained by curing the ink composition can be improved.

The ink composition according to the exemplary embodiment of the invention includes a monofunctional monomer in an amount of 90% by mass or more with respect to the total polymerizable monomer, preferably 95% by mass or more. In particular, in the exemplary embodiment of the invention, the polymerizable monomer preferably includes a monofunctional monomer and a polyfunctional monomer. By including a monofunctional monomer and a polyfunctional monomer, the effect of the invention can be further improved. When a monofunctional monomer and a polyfunctional monomer are included, the mass ratio of the former:the latter (monofunctional monomer:polyfunctional monomer) is preferably from 90:10 to 99.9:0.1, more preferably from 95:5 to 99.9:0.1.

The polymerizable monomer used in the ink composition according to the exemplary embodiment of the invention may be either a radical polymerizable monomer or a cationic polymerizable monomer, but a radical polymerizable monomer is preferred in the invention.

[Radical Polymerizable Monomer]

The radical polymerizable monomer applicable to the present exemplary embodiment of the invention refers to a compound having a radical polymerizable ethylenically unsaturated bond. Specifically, the radical polymerizable monomer is a monomer having at least one radical polymerizable ethylenically unsaturated bond in a molecule.

Examples of the polymerizable compound having a radical polymerizable ethylenically unsaturated bond include unsaturated carboxylic acids such as acrylic acid, methacrylic acid, itaconic acid, crotonic acid, isocrotonic acid and maleic acid; esters thereof; and salts thereof; anhydrides having an ethylenically unsaturated group; acrylonitrile; styrene and the like, as well as macromers of various unsaturated polyesters, unsaturated polyethers, unsaturated polyamides and unsaturated urethanes or the like.

The radical polymerizable monomer includes a monofunctional monomer and a polyfunctional monomer. Preferable examples of the monofunctional monomers include acrylate compounds such as 2-hydroxyethyl acrylate, butoxyethyl acrylate, carbitol acrylate, cyclohexyl acrylate, tetrahydrofurfuryl acrylate, benzyl acrylate, tridecyl acrylate, 2-phenoxyethyl acrylate, N-methylolacrylamide, diacetoneacrylamide, epoxy acrylate, isobornyl acrylate, dicyclopentenyl acrylate, dicyclopentenyloxyethyl acrylate, dicyclopentanyl acrylate, 2-hydroxy-3-phenoxypropyl acrylate, 2-acryloyloxyethyl phthalate, methoxypolyethylene glycol acrylate, 2-acryloyloxyethyl 2-hydroxyethyl phthalate, cyclic trimethylolpropane formal acrylate, 2-(2-ethoxyethoxy)ethyl acrylate, 2-methoxyethyl acrylate, 3-methoxybutyl acrylate, ethoxylated phenyl acrylate, 2-acryloyloxyethyl succinate, nonylphenol EO adduct acrylate, phenoxypolyethylene glycol acrylate, 2-acryloyloxyethyl hexahydrophthalate, denatured lactone acrylate, stearyl acrylate, isoamyl acrylate, isomyristyl acrylate, isostearyl acrylate, and the like; methacrylates such as methyl methacrylate, n-butyl methacrylate, glycidyl methacrylate, benzyl methacrylate, dimethylaminomethyl methacrylate, and the like; allyl compounds such as allyl glycidyl ether, and the like; and the like.

Among these compounds, acrylate compounds are preferred. In particular, acrylates having a cyclic structure in a molecule are preferred. Specifically, from viewpoints of the viscosity, curability and adhesion with respect to a support, acrylates derived from alcohols having an ether oxygen atom or alcohols having an aromatic ring, such as tetrahydrofurfuryl acrylate, 2-phenoxyethyl acrylate, and the like are preferred. For a similar reason, acrylates having a bicyclo cyclic structure or a tricyclo cyclic structure such as isobornyl acrylate, dicylopentenyl acrylate, dicyclopentenyloxyethyl acrylate, dicyclopentanyl acrylate and the like are preferred, and acrylates having a double bond in an alicyclic structure such as dicyclopentenyl acrylate, dicyclopentenyloxyethyl acrylates and the like are particularly preferred. In addition to the acrylates having a cyclic structure, acrylates having an oxyalkylene group are also preferred, and specific examples thereof include ethoxyethoxyethyl acrylate, 2-methoxyethyl acrylate, 3-methoxybutyl acrylate, butoxyethyl acrylate and the like.

Monofunctional vinyl ether compounds are also exemplified as the monofunctional monomer. Examples of the monofunctional vinyl ether compounds include methyl vinyl ether, ethyl vinyl ether, n-propyl vinyl ether, isopropyl vinyl ether, n-butyl vinyl ether, isobutyl vinyl ether, t-butyl vinyl ether, n-octadecyl vinyl ether, 2-ethylhexyl vinyl ether, n-nonyl vinyl ether, dodecyl vinyl ether, octadecyl vinyl ether, cyclohexyl vinyl ether, cyclohexylmethyl vinyl ether, 4-methylcyclohexylmethyl vinyl ether, benzyl vinyl ether, dicyclopentenyl vinyl ether, 2-dicyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxypolyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-hydroxymethylcyclohexylmethyl vinyl ether, diethylene glycol monovinyl ether, polyethylene glycol monovinyl ether, chloroethyl vinyl ether, chlorobutyl vinyl ether, chloroethoxyethyl vinyl ether, phenethyl vinyl ether, phenoxypolyethylene glycol vinyl ether, cyclohexanedimethanol monovinyl ether, isopropenyl ether-o-propylene carbonate, and the like.

Further, N-vinyl compounds such as N-vinyl lactams, N-vinyl formamides, and the like are preferably exemplified as the monofunctional monomer other than the above. Preferable examples of the N-vinyl lactams include lactams represented by the following formula.

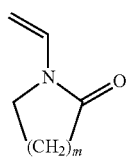

In the above formula, m represents an integer from 1 to 5. From the viewpoints of flexibility of the ink composition after being cured, adhesion with respect to a support and availability of the raw material, m is preferably an integer from 2 to 4, more preferably 2 or 4, and particularly preferably 4, i.e., the N-vinyl lactam is N-vinylcaprolactam. N-vinylcaprolactam is preferably used because the compound is high in safety and provides an ink for forming image exhibiting particularly favorable ink curability and adhesion of an image film with respect to a support.

In the exemplary embodiment of the invention, the monofunctional radical polymerizable monomer is preferably used in a combination of two or more kinds. Preferred examples of the combination include a combination of an acrylate compound and an N-vinyl compound, and a combination of an acrylate having a cyclic hydrocarbon structure in the molecule (more preferably tetrahydrofurfuryl acrylate, 2-phenoxyethyl acrylate or the like) and an N-vinyl compound is particularly preferred. Further, the N-vinyl compound is preferably in a combination of an N-vinyl lactam and N-vinyl formamide. It is also suitable to include an acrylate having an oxyalkylene group in the combination. By combining two or more kinds of monofunctional radical polymerizable monomers, inkjet suitability of an ink such as viscosity, curability, adhesion with respect to a support, or the like, may be further improved.

For example, when an acrylate compound and N-vinyl compound are used in a combination, the ratio of acrylate compound:N-vinyl compound (by mass) may be approximately in a range of from 10:90 to 90:10, more preferably approximately in a range of from 30:70 to 70:30.

Among the N-vinyl compounds, when an N-vinyl lactam and N-vinyl formamide are used in a combination, the mass ratio of N-vinyl lactam:N-vinyl formamide may be approximately in a range of from 10:90 to 90:10, more preferably approximately in a range of from 20:80 to 80:20.

When an acrylate having an oxyalkylene group is used in the combination, the ratio of acrylate compound without an oxyalkylene group(s): acrylate having an oxyalkylene group may be approximately in a range of from 10:90 to 90:10, more preferably approximately in a range of from 20:80 to 60:40.

Examples of the polyfunctional monomers having bi-functionality or more-functionality include acrylates such as bis (4-acryloyloxypolyethoxyphenyl)propane, tripropylene glycol diacrylate, polyethylene glycol diacrylate, polypropylene glycol diacrylate, dipentaerythritol tetraacrylate, trimethylolpropane (PO adduct) triacrylate, oligoester acrylate, neopentyl glycol hydroxypivalate diacrylate, tetramethylolmethane triacrylate, dimethyloltricyclodecane diacrylate, denatured glyceryl triacrylate, bisphenol A diglycidyl ether acrylic acid adduct, denatured bisphenol A diacrylate, PO adducted bisphenol A diacrylate, EO adducted bisphenol A diacrylate, dipentaerythritol hexaacrylate, ptopylene glycol diglycidyl ether acrylic acid adduct, ditrimethylolpropane tetraacrylate, and the like; methacrylates such as polyethylene glycol dimethacrylate, polypropylene glycol dimethacrylate, 2,2-bis (4-methacryloyloxypolyethoxyphenyl)propane, and the like; and the like. Further, allyl compounds such as allyl methacrylate, diallyl phthalate, triallyl trimellitate, and the like are exemplified as the polyfunctional monomer other than the above. Here, "PO" denotes propylene oxide group, and "EO" denotes ethylene oxide group.

Specifically, commercial products described in "Kakyouzai Handbook (Crosslinking Agent—A Handbook)", Ed. Shinzo Yamashita (Taiseisha, 1981); "UV-EB (UV-EB Curing Handbook)" (Raw Materials) Ed. Kiyomi Kato (Kobunshi Kankoukai, 1985); "Kouka Gijutsu no Oyo to Shijo (Application and Market of UV-EB Curing Technology)", p. 79, Ed. Rad Tech (CMC, 1989); and Eiichiro Takiyama "Polyester Resin Handbook", (The Nikkan Kogyo Shimbun Ltd., 1988) and the like, or radical polymerizable or crosslinkable monomers known in the art may be used.

Polyfunctional vinyl ether compounds are also exemplified as the polyfunctional monomer. Examples of the polyfunctional vinyl ethers include divinyl ethers such as ethylene glycol divinyl ether, diethylene glycol divinyl ether, triethylene glycol divinyl ether, polyethylene glycol divinyl ether, propylene glycol divinyl ether, dipropylene glycol divinyl ether, butylene glycol divinyl ether, hexanediol divinyl ether, cyclohexanedimethanol divinyl ether, bisphenol A alkyleneoxide divinyl ether, bisphenol F alkyleneoxide divinyl ether, and the like; polyfunctional vinyl ethers such as trimethylolethane trivinyl ether, trimethylolpropane trivinyl ether, ditrimethylolpropane tetravinyl ether, glycerin trivinyl ether, pentaerythritol tetravinyl ether, dipentaerythritol pentavinyl ether, dipentaerythritol hexavinyl ether, ethyleneoxide adducted trimethylolpropane trivinyl ether, propyleneoxide adducted trimethylolpropane trivinyl ether, ethyleneoxide adducted ditrimethylolpropane tetravinyl ether, propyleneoxide adducted ditrimethylolpropane tetravinyl ether, ethyleneoxide adducted pentaerythritol tetravinyl ether, propyleneoxide adducted pentaerythritol tetravinyl ether, ethyleneoxide adducted dipentaerythritol hexavinyl ether, propyleneoxide adducted dipentaerythritol hexavinyl ether, and the like; and the like. Among the polyfunctional vinyl ether compounds, di- or tri-vinyl ether compounds are preferable, and divinyl ether compounds are particularly preferable from the viewpoints of curability, adhesiveness to the recording medium, surface hardness of the image formed, and the like.

Further, as the radical polymerizable compound, for example, a photo-curing type polymerizable compound that is used for a photopolymerizable composition described in JP-A No. 7-159983, JP-B No. 7-31399, JP-A Nos. 8-224982, 10-863, 9-134011 and JP-W No. 2004-514014 is known and is also usable for the ink composition in the present invention.

—Cationic Polymerizable Monomer—

The cationic polymerizable compound usable in the present invention includes a cationic polymerizable monomer, and is not specifically limited as long as it is a compound which causes a polymerization reaction by an acid generated from a photo-acid generator, and is cured. Various cationic polymerizable monomers publicly known as a photo cationic polymerizable compound may be used. Examples of the cationic polymerizable compound include epoxy compounds, oxetane compounds and the like.

The epoxy compound includes an aromatic epoxide, an alicyclic epoxide, an aliphatic epoxide and the like.

The aromatic epoxide includes a di- or poly-glycidyl ether obtained by a reaction between epichlorohydrin and polyphenol having at least one aromatic nucleus, or an alkylene oxide adduct thereof. Examples thereof include a di- or poly-glycidyl ether of bisphenol A or its alkylene oxide adduct, di- or poly-glycidyl ether of hydrogenated bisphenol A or its alkylene oxide adduct, and novolac type epoxy resin. Here, the alkylene oxide includes ethylene oxide and propylene oxide.

The alicyclic epoxide preferably includes a cyclohexene oxide or cyclopentene oxide including compound obtained by epoxidizing a compound having at least one cycloalkane ring such as a cyclohexene or cyclopentene ring, by a suitable oxidizer such as hydrogen peroxide or peroxy acid.

The aliphatic epoxide includes a di- or poly-glycidyl ether of aliphatic polyalcohol or its alkylene oxide adduct. The representative examples thereof include: diglycidyl ether of alkylene glycol such as diglycidyl ether of ethylene glycol, diglycidyl ether of propylene glycol, or diglycidyl ether of 1,6-hexanediol; polyglycidyl ether of polyalcohol such as di- or tri-glycidyl ether of glycerin or its alkylene oxide adduct; and diglycidyl ether of polyalkylene glycol represented by diglycidyl ether of polyethylene glycol or its alkylene oxide adduct, and diglycidyl ether of polypropylene glycol or its alkylene oxide adduct. Here, the alkylene oxide includes ethylene oxide and propylene oxide.

The epoxy compound includes a monofunctional epoxy compound and a polyfunctional epoxy compound.

Examples of the monofunctional epoxy compound used in the present invention include phenyl glycidyl ether, p-tert-butylphenyl glycidyl ether, butyl glycidyl ether, 2-ethylhexyl glycidyl ether, allyl glycidyl ether, 1,2-butylene oxide, 1,3-butadiene monoxide, 1,2-epoxydodecane, epichlorohydrin, 1,2-epoxydecane, styrene oxide, cyclohexene oxide, 3-methacryloyloxymethylcyclohexene oxide, 3-acryloyloxymethylcyclohexene oxide, and 3-vinylcyclohexene oxide.

Moreover, examples of the polyfunctional epoxy compound include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolac resin, hydrogenated bisphenol A diglycidyl ether, hydrogenated bisphenol F diglycidyl ether, hydrogenated bisphenol S diglycidyl ether, 3,4-epoxycyclohexylmethyl-3',4'-epoxycyclohexanecarboxylate, 2-(3,4-epoxycyclohexyl-5,5-spiro-3,4-epoxy)cyclohexane-meta-dioxane, bis(3,4-epoxycyclohexylmethyl)adipate, vinylcyclohexene oxide, 4-vinylepoxycyclohexane, bis(3,4-epoxy-6-methylcyclohexylmethyl)adipate, 3,4-epoxy-6-methylcyclohexyl-3',4'-epoxy-6'-methylcyclohexanecarboxylate, methylenebis(3,4-epoxycyclohexane), dicyclopentadiene diepoxide, di(3,4-epoxycyclohexylmethyl)ether of ethylene glycol, ethylenebis(3,4-epoxycyclohexanecarboxylate), dioctyl epoxyhexahydrophthalate, di-2-ethylhexyl epoxyhexahydrophthalate, 1,4-butanediol diglycidyl ether, 1,6-hexanediol diglycidyl ether, glycerin triglycidyl ether, trimethylolpropane triglycidyl ether, polyethylene glycol diglycidyl ether, polypropylene glycol diglycidyl ethers, 1,1,3-tetradecadiene dioxide, limonene dioxide, 1,2,7,8-diepoxyoctane, and 1,2,5,6-diepoxycyclooctane.

Among these epoxy compounds, alicyclic epoxides are preferred from the viewpoint of superior curing rate.

A molecular weight of the polymerizable monomer is preferably from 130 to 3,000, and is more preferably from 130 to 500.

A content of the polymerizable monomer in the ink composition is preferably 50% by mass or more, more preferably in a range from 60% by mass to 90% by mass, and even more preferably in a range from 70% by mass to 90% by mass. In the range above, an ink composition having high sensitivity in curability may be obtained.

The ink composition in the present invention may include an oligomer, a prepolymer or a polymer derived from the above polymerizable monomer, other than the polymerizable monomer, as necessary. Specifically, an oligomer, a prepolymer or a polymer derived from a (meth)acrylic monomer, an epoxide monomer, a urethane monomer or the like, are exemplified.

<Organic Fine Particles>

The ink composition according to the exemplary embodiment of the invention includes organic fine particles, and the organic fine particles are crosslinked (hereinafter, the organic fine particles are also referred to as "organic crosslinked fine particles").

The organic crosslinked fine particles are not particularly limited as long as polymers in the fine particles have a network structure in which polymers are bonded to each other in a three-dimensional form. The organic crosslinked fine particle may be, for example, (1) crosslinked fine particles obtained by polymerizing a high-molecular monomer having a crosslinkable group (crosslinked portion) and then allowing the crosslinkable groups to crosslink; or (2) crosslinked fine particles obtained by causing crosslinking of a crosslinkable group simultaneously with polymerization, through a process of allowing a high-molecular monomer having a crosslinkable group and a polymerizable compound capable of being bonded to the crosslinkable group to react with each other at the same time.

Further, in the invention, it is preferred to determine whether the organic fine particles are crosslinked or not crosslinked based on whether or not a glass transition temperature (Tg) can be observed at 300° C. or below. Specifically, for example, if a glass transition temperature is not observed in a range of from −150° C. to 300° C. when carrying out the measurement twice at a temperature elevation rate of 5° C. per minute with a DSC measurement device (EX-STAR6100, trade name, manufactured by Seiko Instruments Inc.), the organic fine particles are determined to be crosslinked in the invention.

In the invention, the solubility parameter of the organic crosslinked fine particles is not particularly limited. However, the solubility parameter may be, for example, 20 $(MPa)^{1/2}$ or more, more preferably from 30 to 50 $(MPa)^{1/2}$, further preferably from 40 to 50 $(MPa)^{1/2}$. When the organic crosslinked fine particles have a solubility parameter within the range above, favorable hardness of a film after being cured, and the like, can be achieved. The solubility parameter may be measured by a method converted from a known method of determining the polarity of a pigment surface as described in "Shikizai (Colorant)", Vol. 62 (8), p. 524 (1989).

Specifically, 1) 0.1 g of a sample (organic crosslinked fine particles) are added to 50 mL of deionized water such that the sample floats on the water surface, and stirred. 2) Acetone is dropped in the deionized water through the wall surface so as not to contact the sample, and the acetone amount A (mL), which allows the sample to uniformly disperse, is determined by titration. 3) Solubility parameter δ at the sample surface is calculated from an equation: solubility parameter $\delta = (50 \times 47.9 + A \times 19.9)/(50+A)$.

The organic crosslinked fine particles are formed by including an organic resin, and examples thereof include an acrylic resin, an acrylic-styrene resin, a silicone-acrylic resin, a melamine-formaldehyde resin, an epoxy resin, a urethane resin, and a polyamide resin such as a nylon resin. Rubber-based resins, such as styrene butadiene rubber (SBR), may also be used.

Among these resins, in the invention, an acrylic resin, an acrylic-styrene resin, an epoxy resin, a urethane resin and a polyamide resin (in particular, a nylon resin) are preferred, and an acrylic resin and an acrylic-styrene resin are particularly preferred.

Specific examples of the organic resin include SX-866 (trade name, manufactured by JSR Corporation), SX-8782 (trade name, manufactured by JSR Corporation), EPOSTAR S series (trade name, manufactured by Nippon Shokubai Co., Ltd.), CHEMISNOW MS 300K (trade name, manufactured by Soken Chemical & Engineering Co., Ltd.), CHALINE R-170S (trade name, manufactured by Nissin Chemical Industry Co., Ltd.), LIOSPHERE series (trade name, manufactured by Toyo Ink Co., Ltd.) and GANZPEARL (trade name, manufactured by GANZ Chemical Co., Ltd.). The organic crosslinked fine particles may also be synthesized. The synthesis method may be, for example, a method described on pages 49 to 54 of "Biryushi Polymer no Shin Tenkai (New Development in Fine Particle Polymers)" (published by Toray Research Center) or the documents cited therein.

The shape of the organic crosslinked fine particles is not particularly limited, and may be any of a sphere shape, a hollow sphere shape, an oval shape or a flat shape. However, the organic crosslinked fine particles preferably have a sphere shape or a hollow sphere shape from the viewpoint of discharge stability.

The volume average particle diameter of the organic crosslinked fine particles may be from 0.01 μm to 3 μm, more preferably from 0.05 μm to 2 μm, and most preferably from 0.1 μm to 1 μm. The volume average particle diameter described above is measured with a laser diffraction scattering-type particle size distribution analyzer (LA920, trade name, manufactured by Horiba, Ltd.) using tripropylene glycol methyl ether as a measurement solvent.

The surface of the organic crosslinked fine particles may be functionalized by carrying out a desired organic treatment, for example, with a carboxyl group, a hydroxyl group, an epoxy group, an amino group or the like. From the viewpoint of stretchability with heat, the organic crosslinked fine particles are preferably free from a radical polymerizable group.

The content of the organic crosslinked fine particles in the ink composition is not particularly limited, but may be approximately in a range from 1% by mass to 30% by mass, and preferably approximately in a range from 1% by mass to 20% by mass.

The invention can provide an ink composition having excellent blocking sensitivity by including a polymerizable monomer as specified above and organic crosslinked fine particles, and a film formed from the ink composition (printed image) which exhibits favorable shaping suitability and punching suitability. The mechanism thereof is not clear, but is presumed to be as follows.

The ink composition according to the exemplary embodiment of the invention forms a resin matrix (printed image) mainly from linear polymers entangled with each other by curing a monofunctional monomer as a main component. The thus obtained resin matrix exhibits a much better plasticity than that of a three-dimensional network structured resin matrix obtained by curing polyfunctional monomers. As a result, the resin matrix exhibits favorable stretchability in a process of thermal shaping due to improved shaping suitability. Moreover, the resin matrix can deform flexibly in response to a quick impact such as cutting and can disperse the impact, thereby suppressing formation of cracks at the cut portion and its periphery. In addition, due to the presence of the organic crosslinked fine particles, it is presumed that a strong film (printed image) can be formed due to the interaction among the fine particles, and the monofunctional monomers can be cured with a small amount of actinic radiation rays due to an volume exclusion effect achieved by incorporation of the organic crosslinked fine particles, thereby reducing the tackiness of the printed image and suppressing blocking (adhesion of the printed image to a back surface of another printed article or lack of image portion due to exfoliation). However, the invention is not limited to the aforementioned presumed mechanism.

<Polymerization Initiator>

The ink composition according to the exemplary embodiment of the invention includes a polymerization initiator.

The polymerization initiator used in the invention may be either a thermal polymerization initiator or a photopolymerization initiator, but a photopolymerization initiator is preferably used in the invention. The photopolymerization initiator may be appropriately selected from known photopolymerization initiators and used, depending on the type of the polymerizable compound or the intended use of the ink composition.

The photopolymerization initiator that may be used in the invention is a compound that generates radicals (polymerization initiating species) by absorbing external energy (light). Examples of the light for initiating polymerization include actinic radiation rays such as γ-ray, β-ray, electron beam, ultraviolet ray, visible ray and infrared ray. Among these, ultraviolet ray is preferred.

The photopolymerization initiator may be a known compound, and preferred examples of the photopolymerization initiator that may be used in the invention include (a) aromatic ketones, (b) acylphosphine oxide compounds, (c) aromatic onium salt compounds, (d) organic peroxides, (e) thio compounds, (f) hexaaryl biimidazole compounds, (g) ketoxime ester compounds, (h) borate compounds, (i) azinium compounds, (j) methallocene compounds, (k) active ester compounds, (l) carbon-halogen bond-containing compounds, and (m) alkylamine compounds.

The photopolymerization initiator may be a single compound selected from (a) to (m) above or a combination of two or more compounds selected from (a) to (m) above. In the invention, the photopolymerization initiator is suitably used as a single compound or as a combination of two or more compounds.

Preferred examples of (a) aromatic ketones, (b) acylphosphine oxide compounds and (e) thio compounds include compounds having a benzophenone skeleton or a thioxanthone skeleton described in pages 77 to 117 of Radiation Curing in Polymer Science and Technology, J. P. Fouassier, J. F. Rabek (1993), and the like. More preferred examples include α-thiobenzophenone compounds described in Japanese Examined Patent Publication (JP-B) No. 47-6416, benzoin ether compounds described in Japanese Examined Patent Publication No. 47-3981, α-substituted benzoin compounds described in JP-B No. 47-22326, benzoin derivatives described in JP-B No. 47-23664, aroylphosphonic acid esters described in JP-A 57-30704, dialkoxybenzophenones described in JP-B No. 60-26483, benzoin ethers described in JP-B No. 60-26403 and JP-A No. 62-81345, α-aminobenzophenones described in JP-B No. 1-34242, U.S. Pat. No. 4,318,791 and European Patent No. 0284561A1, p-di(dimethylaminobenzoyl)benzenes described in JP-A No. 2-211452, thio-substituted aromatic ketones described in JP-A No. 61-194062, acylphosphine sulfides described in JP-B No. 2-9597, acylphosphines described in JP-B No. 2-9596, thioxanthones described in JP-B No. 63-61950, and coumarins. Further, polymerization initiators described in JP-A No. 2008-105379 and JP-A No. 2009-114290 are also preferred.

Among these compounds, in the invention, aromatic ketones or acylphosphine oxide compounds are preferably used as a photopolymerization initiator, and examples thereof include p-phenylbenzophenone (manufactured by Wako Pure Chemical Industries, Ltd.), bis(2,4,6-trimethylbenzoyl)-phenylphosphine oxide (IRGACURE 819, trade name, manufactured by BASF Japan Ltd.), bis(2,6-dimethoxybenzoyl)-2,4,4-trimethyl-pentylphenylphosphine oxide and 2,4,6-trimethylbenzoyl-diphenyl-phosphine oxide (DAROCURE TPO and LUCIRIN TPO, trade names, all manufactured by BASF Japan Ltd.)

The polymerization initiator may be used alone or in a combination of two or more kinds thereof.

The content of the polymerization initiator in the ink composition is preferably from 0.1 to 20% by mass, more preferably from 0.5 to 15% by mass, and even more preferably from 1 to 10% by mass, with respect to the total mass of the ink composition.

<Colorant>

The ink composition of the invention may contain a colorant. By adding a colorant to the ink composition, an ink composition which may form visible images (colored images) may be obtained.

The colorant which may be used for the ink composition of the invention is not specifically limited, and known various colorants (pigments and dyes) may be suitably selected and used according to the purpose. For example, when an image having excellent weather resistance is to be formed, a pigment is preferable. As the dye, both water-soluble dyes and oil-soluble dyes may be used, but oil-soluble dyes are preferable.

—Pigment—

The pigment preferably used as colorant in the ink composition of the invention is described. When a pigment is used in the ink composition as the colorant, a colored image formed by using the ink composition may exhibit excellent lightfastness.

The pigment is not particularly limited, and any commercially available organic and inorganic pigment, a pigment dispersed in an insoluble resin or the like as a dispersion medium, or a pigment having a resin grafted on the surface thereof can be used. Resin particles dyed with a dye can also be used.

Examples of these pigments include the pigments described in Seijiro Ito "Pigment dictionary" (2000), W. Herbst, K. Hunger "Industrial Organic Pigments", JP-A No. 2002-12607, JP-A No. 2002-188025, JP-A No. 2003-26978, and JP-A No. 2003-342503.

Specific examples of the organic and inorganic pigments exhibiting, for example, yellow color employable in the present invention, include a monoazo pigment such as C.I. Pigment Yellow 1 (e.g., Fast Yellow G), and C.I. Pigment Yellow 74, a disazo pigment such as C.I. Pigment Yellow 12 (e.g., Disazo Yellow AAA) and C.I. Pigment Yellow 17, a non-benzidine azo pigment such as C.I. Pigment Yellow 180, an azo lake pigment such as C.I. Pigment Yellow 100 (e.g., Tartrazine Yellow Lake), a condensed azo pigment such as C.I. Pigment Yellow 95 (e.g., Condensed Azo Yellow GR), an acidic dye lake pigment such as C.I. Pigment Yellow 115 (e.g., Quinoline Yellow Lake), a basic dye lake pigment such as C.I. Pigment Yellow 18 (e.g., Thioflavin Lake), an anthraquinone pigment such as Flavanthrone Yellow (Y-24), an isoindolinone pigment such as Isoindolinone Yellow 3RLT (Y-110), a quinophthalone pigment such as Quinophthalone Yellow (Y-138), an isoindoline pigment such as Isoindoline Yellow (Y-139), a nitroso pigment such as C.I. Pigment Yellow 153 (e.g., Nickel Nitroso Yellow), and a metallic complex azomethine pigment such as C.I. Pigment Yellow 117 (e.g., Copper Azomethine Yellow).

Examples thereof exhibiting red or magenta color include a monoazo pigment such as C.I. Pigment Red 3 (e.g., Toluidine Red), a disazo pigment such as C.I. Pigment Red 38 (e.g., Pyrazolone Red B), an azo lake pigment such as C.I. Pigment Red 53:1 (e.g., Lake Red C) and C.I. Pigment Red 57:1 (e.g., Brilliant Carmine 6B), a condensed azo pigment such as C.I. Pigment Red 144 (e.g., Condensed Azo Red BR), an acidic dye lake pigment such as C.I. pigment red 174 (e.g., Phloxin B lake), a basic dye lake pigment such as C.I. Pigment Red 81 (e.g., Rhodamine 6G' Lake), an anthraquinone pigment such as C.I. Pigment Red 177 (e.g., Dianthraquinonyl Red), a thioindigo pigment such as C.I. Pigment Red 88 (e.g., Thioindigo Bordeaux), a perynone pigment such as C.I. Pigment Red 194 (e.g., Perynone Red), a perylene pigment such as C.I. Pigment Red 149 (e.g., Perylene Scarlett), a quinacridone pigment such as C.I. Pigment Violet 19 (unsubstituted quinacridone), C.I. Pigment Red 122 (e.g., Quinacridone Magenta), an isoindolinone pigment such as C.I. Pigment Red 180 (e.g., Isoindolinone Red 2BLT), and an alizarin lake pigment such as C.I. Pigment Red 83 (e.g., Madder Lake).

Examples thereof exhibiting blue or cyan color include a disazo pigment such as C.I. Pigment Blue 25 (e.g., Dianisidine Blue), a phthalocyanine pigment such as C.I. Pigment Blue 15 (e.g., Phthalocyanine Blue), an acidic dye lake pigment such as C.I. Pigment Blue 24 (e.g., Peacock Blue Lake), a basic dye lake pigment such as C.I. Pigment Blue 1 (e.g., Victoria Pure Blue BO Lake), an anthraquinone pigment such as C.I. Pigment Blue 60 (e.g., Indanthrone Blue), and an alkali blue pigment such as C.I. Pigment Blue 18 (e.g., Alkali Blue V-5:1).

Examples thereof exhibiting green color include a phthalocyanine pigment such as C.I. Pigment Green 7 (Phthalocyanine Green), and C.I. Pigment Green 36 (Phthalocyanine Green), and an azo metal complex pigment such as C.I. Pigment Green 8 (Nitroso Green).

Examples thereof exhibiting orange color include an isoindolin pigment such as C.I. Pigment Orange 66 (Isoindolin Orange), and an anthraquinone pigment such as C.I. Pigment Orange 51 (Dichloropyranthrone Orange).

Examples thereof exhibiting black color include carbon black, titanium black, and aniline black.

As specific examples of white pigment, basic lead carbonate ($2PbCO_3Pb(OH)_2$, so-called silver white), zinc oxide (ZnO, so-called zinc white), titanium oxide ($TiO_2$, so-called, titanium white), and strontium titanate ($SrTiO_3$, so-called titanium strontium white) are employable.

Here, titanium oxide has a lesser specific gravity and a greater refractive index, and is chemically and physically stable, compared to other white pigments. Therefore, it has a greater concealing and tinting power as a pigment, and furthermore has a superior durability against acid, alkali, and other environments. Therefore, the titanium oxide is preferably used as a white pigment. Of course, other white pigments (which may be other than the abovementioned white pigments) may be used as necessary.

For dispersing the pigment, respective dispersing devices such as a ball mill, a sand mill, an attritor, a roll mill, a jet mill, a homogenizer, a paint shaker, a kneader, an agitator, a Henschel mixer, a colloid mill, an ultrasonic homogenizer, a pearl mill, and a wet type jet mill may be used.

Dispersing agents can also be added when a pigment is to be dispersed. Examples of the dispersing agent include a hydroxy group including carboxylate ester, a salt of long-chain polyaminoamide and high molecular weight acid ester, a salt of high molecular weight polycarboxylate, a high molecular weight unsaturated acid ester, a high molecular weight copolymer, a modified polyacrylate, an aliphatic polyvalent carboxylic acid, a naphthalenesulfonic acid-formalin condensate, a polyoxyethylenealkyl phosphate ester, and pigment derivatives. Moreover, a commercially available polymer dispersing agent such as a SOLSPERSE series; trade name, made by Japan Lubrizol Ltd. may be preferably used.

As a dispersing auxiliary, a synergist according to various types of pigments may be used. 1 parts by mass to 50 parts by mass of the dispersing agent and the dispersing auxiliary are preferably added with respect to 100 parts by mass of the pigment.

In the ink composition, a solvent may be added as a dispersion medium for various components such as a pigment. Moreover, the polymerizable compound serving as a low molecular weight component may be used as a dispersion medium, without any solvent. Since the ink composition of the present invention is a radiation ray curable ink, and the ink is cured after the application onto the recording medium, it is preferable that the ink composition substantially contains no solvent other than the polymerizable monomer. The reason is that, if the solvent remains in a cured ink image, problems that, for example, the solvent resistance of the cured ink image is degraded, an environmental issue of a VOC (volatile organic compound) of the remained solvent is induced and the like, would occur. From such a viewpoint, polymerizable compounds are preferably used as the dispersion medium. Among these, a cationic polymerizable monomer having the lowest viscosity is preferably selected from the viewpoints of improving dispersing properties, and improving handling properties of the ink composition.

A volume average particle diameter of the pigment particles in the ink composition is preferably in a range from 0.02 μm to 0.60 μm, and more preferably in a range from 0.02 μm to 0.10 μm. A maximum particle diameter of the pigment particles is preferably 3 μm or less, and more preferably 1.0 μm or less. In order to set the volume particle diameter of the pigment particle within the preferable range, a pigment, a dispersing agent, and a dispersing medium are selected, and dispersing and filtering conditions are set. Such control of the particle diameter prevents clogging at the jet nozzle, and maintains the ink storage stability, the ink transparency, and the blocking resistance. The volume average particle diameter is measured by using tripropylene glycol methyl ether as a solvent for measurement and a laser diffraction scattering type particle size distribution measurement apparatus (LA920; trade name, manufactured by HORIBA Ltd.)

—Dye—

Next, the dye which is preferably used as a colorant in the invention is described.

The dye may be suitably selected and used from conventionally-known compounds (dyes). Specific examples may include the compounds described in paragraphs [0023] to [0089] of JP-A No. 2002-114930, paragraphs [0136] to [0140] of JP-A No. 2008-13646 and the like, and these may also be applied to the invention.

The colorant is added to the ink composition preferably in a range from 0.05% by mass to 20% by mass, more preferably in a range 0.2% by mass to 10% by mass with respect to the total mass of the ink composition. When an oil-soluble dye is used as a colorant, it is preferably in a range from 0.2% by mass to 6% by mass with respect to the total mass (including solvent) of the ink composition.

<Water>

The ink composition according to the exemplary embodiment of the invention is preferably a non-aqueous ink composition that is substantially free from water. Specifically, the water content with respect to the total mass of the ink composition is preferably 3% by mass or less, more preferably 2% by mass or less, and most preferably 1% by mass or less. When the water content is within this range above, favorable storage stability may be achieved.

[Other Components]

The ink composition according to the exemplary embodiment of the invention may include other components than the above compounds, as described below.

(Chain Transfer Agent)

The ink composition according to the exemplary embodiment of the invention may further include a chain transfer agent.

The chain transfer agent is not particularly limited as long as it is a compound that can transfer the active point of reaction via chain transfer reaction in the polymerization reaction.

Examples of a chain transfer agent usable in the present invention include halogeno compounds such as carbon tetrachloride, carbon tetrabromide, and the like; alcohols such as isopropyl alcohol, isobutyl alcohol, and the like; olefins such as 2-methyl-1-butene, 2,4-diphenyl-4-methyl-1-pentene, and the like; organic sulfur compounds such as ethanethiol, butanethiol, dodecanethiol, mercaptoethanol, mercaptopropanol, methyl mercaptopropionate, ethyl mercaptopropionate, mercaptopropionic acid, thioglycolic acid, diethyldisulfide, di(sec-butyl)disulfide, bis(2-hydroxyethyl)disulfide, thiosalicylic acid, thiophenol, thiocresol, benzylmercaptan, phenethylmercaptan, thiocarbonate, 1,4-bis(3-mercaptobutyroyloxy)butane, 1,3,5-tris(3-mercaptobutyroyloxyethyl)-1,3,5-triazine-2,4,6-(1H,3H,5H)-trione, pentaerythritol tetrakis(3-mercaptobutyrate), and the like, but are not limited thereto.

Among above, the chain transfer agent is preferably a thiol compound from the viewpoints of storage stability and improved curing sensitivity of the ink composition. Further, the chain transfer agent is preferably a polyfunctional thiol compound having a secondary thiol group or a tertiary thiol group.

A molecular weight of the chain transfer agent is preferably 250 or more, more preferably 250 or more but 100,000 or less, and even more preferably 500 or more but 80,000 or less.

KARENZ MT series (trade name, manufactured by SHOWA DENKO K.K.) are preferably used as a commercial product for the chain transfer agent. Further, specific exemplary compounds of CTA-1 to CTA-8 listed below are also preferably used as the chain transfer agent.

CTA-1

Mw = 16000

CTA-2

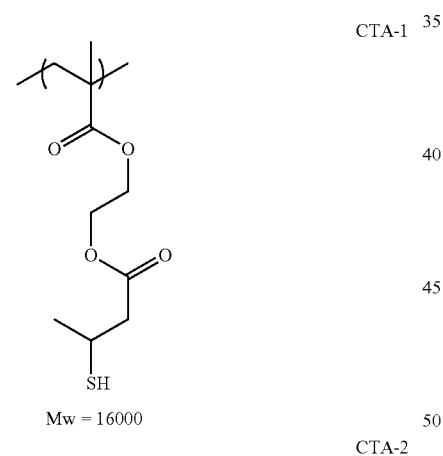

Mw = 24000

CTA-3

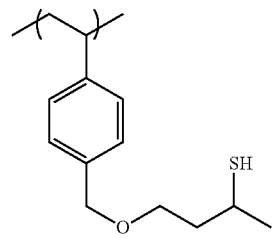

Mw = 28000

CTA-4

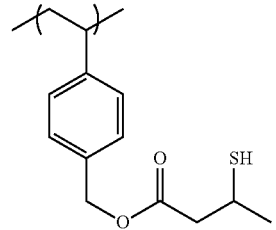

Mw = 40000

CTA-5

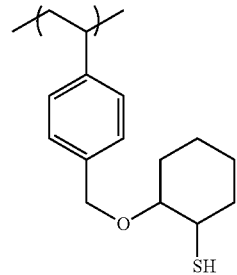

Mw = 56000

CTA-6

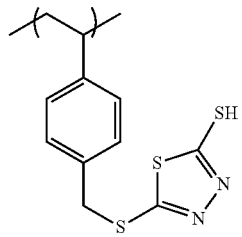

Mw = 30000

CTA-7

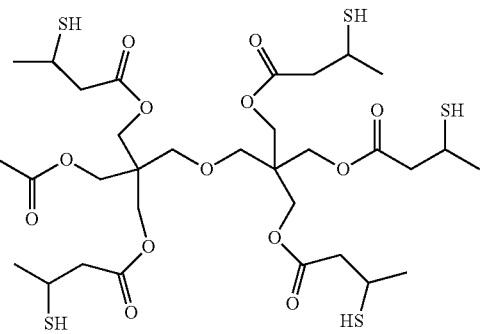

Mw = 867

-continued

CTA-8

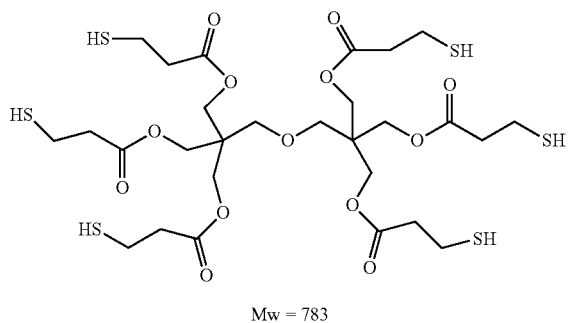

Mw = 783

The chain transfer agent may be used alone or in a combination of two or more kinds thereof.

The amount of the chain transfer agent to be added to the ink composition according to the exemplary embodiment of the invention is preferably from 0.1% by mass to 15% by mass, more preferably from 0.5% by mass to 10% by mass, and most preferably from 1% by mass to 10% by mass, with respect to the total mass of the component of the ink composition.

(Sensitizing Dye)

The ink composition according to the exemplary embodiment of the invention may further include a sensitizing dye in order to promote decomposition of the polymerization initiator upon actinic ray irradiation. The sensitizing dye is electronically excited when it absorbs specific actinic radiation rays. When the electronically excited sensitizing dye contacts the polymerization initiator, it causes an action such as electron transfer, energy transfer, exotherm or the like, thereby promoting the chemical reaction of the polymerization initiator, i.e., decomposition or generation of radicals, acid or base.

The sensitizing dye may be selected from compounds depending on the wavelength of the actinic radiation ray that allows the photopolymerization initiator used in the ink composition to generate an initiating species. In consideration of using the sensitizing dye in the typical curing reaction of the ink composition, preferred examples of the sensitizing dye include compounds belonging to the following compounds and having an absorption wavelength in a region of from 350 nm to 450 nm.

Polynuclear aromatic compounds (such as anthracene, pyrene, perylene and triphenylene), thioxanthones (such as isopropylthioxanthone), xanthenes (such as flourescein, eosin, erythrosine, rhodamine B and rose bengal), cyanines (such as thiacarbocyanine and oxacarbocyanine), merocyanines (such as merocyanine and carbomerocyanine), thiazines (such as thionin, methylene blue and toluidine blue), acridines (such as acridine orange, chloroflavin and acriflavin), anthraquinones (such as anthraquinone), squaryliums (such as squarylium), coumarins (such as 7-diethylamino-4-methylcouomarin) and the like. Among these, polynuclear aromatic compounds and thioxanthones are preferred.

Sensitizing dyes described in JP-A No. 2008-95086 are also preferred.

(Cosensitizer)

The ink composition of the invention may include a cosensitizer. In the invention, the cosensitizer has a function of further improving the sensitivity of the sensitizing dye to radioactive ray, or a function of suppressing inhibition by oxygen of polymerization of the polymerizable compound, or the like.

Examples of such cosensitizer may include amines such as the compounds described in M. R. Sander et al., "Journal of Polymer Science", Vol. 10, p. 3173 (1972), JP-B No. 44-20189, JP-A Nos. 51-82102, 52-134692, 59-138205, 60-84305, 62-18537 and 64-33104, and Research Disclosure No. 33825, and specific examples include triethanolamine, p-dimethylaminobenzoic acid ethyl ester, p-formyldimethylaniline and p-methylthiodimethylaniline.

Other examples of the cosensitizer include thiols and sulfides such as the thiol compounds described in JP-A No. 53-702, JP-B No. 55-500806 and JP-A No. 5-142772, and the disulfide compounds of JP-A No. 56-75643, and specific examples include 2-mercaptobenzothiazole, 2-mercaptobenzoxazole, 2-mercaptobenzimidazole, 2-mercapto-4(3H)-quinazoline and β-mercaptonaphthalene.

Yet other examples of the cosensitizer include amino acid compounds (e.g. N-phenylglycine, etc.), the organometallic compounds described in JP-B No. 48-42965 (e.g. tributyltin acetate, etc.), the hydrogen-donating compounds described in JP-B No. 55-34414, the sulfur compounds described in JP-A No. 6-308727 (e.g. trithiane, etc.), the phosphorus compounds described in JP-A No. 6-250387 (diethylphosphite, etc.), and Si—H and Ge—H compounds.

[Ultraviolet Absorber]

In the ink composition of the present invention, an ultraviolet absorber may be used from the viewpoints of improving the weather resistance, preventing discoloration of the obtained image and the like.

Examples of the ultraviolet absorber include benzotriazol compounds described in JP-A Nos. 58-185677, 61-190537, 02-782, 05-197075 and 09-34057; benzophenone compounds described in JP-A Nos. 46-2784 and 05-194483, and U.S. Pat. No. 3,214,463; cinnamic acid compounds described in JP-B Nos. 48-30492 and 56-21141, and JP-A No. 10-88106; triazine compounds described in JP-A Nos. 04-298503, 08-53427, 08-239368, and 10-182621, and JP-W No. 08-5012911; compounds described in Research Disclosure No. 24239; and compounds which absorb ultraviolet rays to generate fluorescence, such as stilbene and benzoxazol compounds, being so-called fluorescent brightening agents.

The addition amount is suitably selected according to the object, however generally it is in a range from 0.5% by mass to 15% by mass in terms of solid contents.

[Anti-Oxidant]

An anti-oxidant may be added in order to improve the stability of the ink composition in the present invention. Examples of the anti-oxidant include ones described in European Patent Publication Nos. 223739, 309401, 309402, 310551, 310552, and 459416, German Patent Publication No. 3435443, JP-A Nos. 54-48535, 62-262047, 63-113536, and 63-163351, JP-A No. 02-262654, JP-A No. 02-71262, JP-A No. 03-121449, JP-A No. 05-61166, JP-A No. 05-119449, U.S. Pat. No. 4,814,262, and U.S. Pat. No. 4,980,275.

The dosage is suitably selected according to the object, however this is preferably in a range from 0.1% by mass to 8% by mass in terms of solid contents.

[Discoloration Inhibitor]

Various organic compounds and metal complexes can be used as a discoloration inhibitor in the ink composition in the present invention. Examples of the organic discoloration inhibitor include hydroquinones, alkoxyphenols, dialkoxyphenols, phenols, anilines, amines, indans, chromans, alkoxyanilines, and heterocycles. Examples of the metal complexes include a nickel complex and a zinc complex. Specific examples thereof include the compounds described in the cited patents described in the I and J paragraphs of the VII section of Research Disclosure No. 17643, and Research Disclosure No. 15162, the left column of page 650 of Research Disclosure No. 18716, page 527 of Research Disclosure No. 36544, and page 872 of Research Disclosure No. 307105, and Research Disclosure No. 15162, and compounds included in Formulae of the representative compounds and examples of the compounds described in JP-A No. 62-215272, pages 127 to 137.

The addition amount is suitably selected according to the object, however it is preferably in a range from 0.1% by mass to 8% by mass in terms of solid contents.

[Electrically Conductive Salts]

With an object of controlling the discharging property, electrically conductive salts such as potassium thiocyanate, lithium nitrate, ammonium thiocyanate, and dimethylamine hydrochloride may be added into the ink composition of the present invention.

[Solvent]

In order to improve the adhesions with the recording medium (base material), a trace amount of non-curable organic solvent may be added into the ink composition of the present invention.

Examples of the solvent include: ketone solvents such as acetone, methyl ethyl ketone, diethyl ketone; alcohol solvents such as methanol, ethanol, 2-propanol, 1-propanol, 1-butanol, and tert-butanol; chlorine-based solvents such as chloroform and methylene chloride; aromatic solvents such as benzene and toluene; ester solvents such as ethyl acetate, butyl acetate, and isopropyl acetate; ether solvents such as diethyl ether, tetrahydrofuran, and dioxane; and glycol ether solvents such as ethylene glycol monomethyl ether and ethylene glycol dimethylether.

In this case, the effective addition is within a range not causing problems such as deterioration of solvent resistance and generation of VOC. The amount thereof is preferably within a range of from 0.1% by mass to 5% by mass, and more preferably from 0.1% by mass to 3% by mass with respect to the amount of the total ink composition.

[Polymer Compound]

In order to adjust the film property, various oil-soluble polymer compounds may be added into the ink composition of the present invention. Examples of the oil-soluble polymer compounds include an acrylic polymer, a polyvinyl butyral resin, a polyurethane resin, a polyamide resin, a polyester resin, an epoxy resin, a phenol resin, a polycarbonate resin, a polyvinylformal resin, a shellac, a vinyl resin, an acrylic resin, a rubber resin, waxes, and other natural resins. Two of them may be used in combination. Among these, preferred is a vinyl copolymer obtained by copolymerization of acrylic monomers. Furthermore, copolymers including a structural unit derived from "carboxy group containing monomers", "alkyl methacrylate", or "alkyl acrylate" as a copolymer component of the polymer compound can be also preferably used.

Further, in order to improve tackiness and the like in a film formed by using the ink composition of the present invention, a polymer compound which is easily segregated on the surface of the film is preferably used. As these polymer compounds, polymers containing Si atom, F atom, a long alkyl chain group at side chain of the polymer, or the like, described in the paragraphs from [0017] to [0037] of JPA No. 2008-248119 or in the paragraphs from [0015] to [0034] of JPA No. 2005-250890, may be used.

[Surfactant]

A surfactant may be added to the ink composition of the present invention.

Examples of the surfactant include those described in JP-A Nos. 62-173463 and 62-183457. Examples thereof include: anionic surfactants such as dialkyl sulfosuccinate, alkyl naphthalenesulfonate, fatty acid salt, and the like; nonionic surfactants such as polyoxyethylene alkyl ether, polyoxyethylene alkyl aryl ether, acetylenic glycol, polyoxyethylene/polyoxypropyrene block copolymer, and the like; and cationic surfactants such as alkylamine salt, quaternary ammonium salt, and the like. A fluorocarbon compound may be used instead of the surfactant. The fluorocarbon compound is preferably hydrophobic. Examples of the fluorocarbon compound include fluorine-containing surfactants, oily fluorine-containing compounds (such as fluorine oil and the like), and fluorine-containing solid resins (such as ethylene tetrafluoride resin and the like). The fluorocarbon compounds are described in JP-B No. 57-9053 (column 8 to 17), and JP-A No. 62-135826.

While a content of the surfactant in the ink composition is arbitrarily selected in accordance with the intended use, the content is preferably in a range from 0.0001% by mass to 1% by mass, and more preferably in a range from 0.001% by mass to 0.1% by mass.

In addition, polymerization inhibitors, leveling addition agents, matte agents, waxes for adjusting the film property, and a tackifier (adhesiveness imparting agent) which does not inhibit the polymerization, to improve the adhesion with the recording medium such as polyolefine or PET may be added as necessary.

Examples of the polymerization inhibitor include, for example, hydroquinone, methoxybenzoquinone, methoxyphenol, phenothiazine, t-butylcatechol, mercaptobenzimidazole, alkyldithiocarbamic acid salts, alkylphenols, alkylbisphenols, salicylic acid salts, thiodipropionic acid esters, phosphites, nitroxide aluminum complexes, and the like. Specific examples of the polymerization inhibitor include GERORAD 16, 18, 20, 21, 22 (trade name, manufactured by RAHN AG.) While a content of the polymerization inhibitor in the ink composition is not limited, however, the content is preferably in a range from 0.01% by mass to 5% by mass, and more preferably in a range from 0.02% by mass to 1% by mass with respect to the ink composition.

Specific examples of the tackifier include cohesive polymers of high molecular weight described in JP-A No. 2001-49200, pages 5 and 6 (for example, a copolymer having an ester of (meth)acrylate and alcohol including an alkyl group having 1 to 20 carbon atoms, an ester of (meth)acrylate and alicyclic alcohol having 3 to 14 carbon atoms, and an ester of (meth)acrylate and aromatic alcohol having 6 to 14 carbon atoms), and tackifying resins of low molecular weight having a polymerizable unsaturated bond.

Considering the discharging property since the ink composition in the present invention is used for an inkjet use, the viscosity of the ink composition of the present invention is preferably in a range from 7 mPa·s to 30 mPa·s, and more preferably in a range from 7 mPa·s to 20 mPa·s at a temperature (for example, 40° C. to 80° C.) at the time of ejection. The ink viscosity is, for example, preferably in a range from 35 mPa·s to 500 mPa·s, and more preferably in a range from 35 mPa·s to 200 mPa·s at room temperature (from 25° C. to 30° C.).

It is preferred to suitably adjust and determine the composition ratio so that the viscosity is within the above range. By setting a high viscosity at room temperature, even when a porous recording medium is used, it becomes possible to prevent ink permeation into the recording medium, to decrease the uncured monomer, and to reduce odor. Furthermore, dot bleeding at the time of ink droplet spotting can be suppressed, resulting in improvement in the image quality. When the ink viscosity at 25° C. to 30° C. is less than 35 mPa·s, the effect of preventing bleeding is insufficient. In the ink composition of the present invention, a ratio of a mass of the ink composition before curing by irradiation of an actinic radiation versus a mass of the image formed by curing and drying with irradiation of the actinic radiation (the former:the later) (the mass of the ink composition:the mass of the cured image of the ink composition) is preferably in a range from (100:95) to (100:100), and more preferably in a range from (100:97) to (100:100). By setting the mass ratio in the range above, deterioration with age of film property in the image formed is effectively suppressed. The mass ratio may be adjusted by adequately setting an amount(s) of water, solvent or the like contained in the ink composition.

The ink composition of the present invention adjusted in this manner is used as an inkjet recording ink. When it is used as an inkjet recording ink, the ink composition is ejected onto a recording medium by an inkjet recording apparatus, and then the ejected ink composition is cured by irradiation of radiation to perform recording.

2. Printed Article, Method of Producing the Printed Article and Shaped Printed Product The method of producing the printed article includes a step of forming an image by discharging the ink composition according to the exemplary embodiment of the invention onto a recording medium by inkjetting, using a known inkjet recording apparatus including commercially available apparatuses or the like; and a step of obtaining a printed article having a cured image formed on the recording medium by curing the ink composition by exposing the image to actinic radiation rays. The printed article according to the invention is produced by a method of producing the printed article as mentioned above.

The recording medium (base material) which can be applied to the producing method of the present invention is not specifically limited, and papers such as a normal uncoated paper and a coated paper, various non-absorptive resin materials used for so-called soft packaging, or a resin film thereof formed into a film shape may be used. Examples of various plastic films include a PET film, an OPS film, an OPP film, an ONy film, a PVC film, a PE film, a TAC film and the like. Other plastics that can be used as a material of the recording medium include a polycarbonate, an acrylic resin, ABS, polyacetal, PVA, rubbers and the like. Moreover, metals or glasses may be used as a recording medium. Furthermore, a support for a planographic printing plate may be included as the recording medium which can be applied in the present invention.

Examples of the actinic radiation ray which can be applied to the producing method in the present invention include: α rays; γ rays; X-rays; ultraviolet rays; visible light; infrared rays; electron beams; and the like. The peak wavelength of the actinic radiation ray is preferably in a range from 200 nm to 600 nm, more preferably in a range from 300 nm to 450 nm, and even more preferably in a range from 350 nm to 420 nm.

The power of the actinic radiation ray is preferably 2,000 mW/cm$^2$ or less, more preferably in a range from 10 mW/cm$^2$ to 2,000 mW/cm$^2$, even more preferably in a range from 20 mW/cm$^2$ to 1,000 mW/cm$^2$, and particularly preferably in a range from 50 mW/cm$^2$ to 800 mW/cm$^2$.

Specifically, in the producing method of the invention, it is preferable that the radioactive ray is irradiated from a light emitting diode which has an emission peak wavelength of 350 nm to 420 nm and generates ultraviolet ray which gives the maximum illuminance of 10 mW/cm$^2$ to 2,000 mW/cm$^2$ on the surface of the medium to be recorded. The ink composition of the invention cures with high sensitivity by light of low exposure amount such as light emitted from a light emitting diode.

In the method according to the exemplary embodiment of the invention, since the ink composition according to the invention is used and the ink composition is cured by exposing the same to actinic radiation rays, an image that exhibits a high degree of hardness and excellent shaping suitability and punching suitability can be formed. The irradiation with actinic radiation ray may be performed at one time after discharging the inks of all colors, but it is preferred to perform the irradiation each time after the ink of each color is discharged from the viewpoint of promoting curing.

The printed article according to the exemplary embodiment of the invention includes an image formed by using the ink composition according to the invention, according to the method as described above. Therefore, the printed article has an image that exhibits a high degree of hardness and excellent shaping suitability and punching suitability.

Further, as mentioned above, the ink composition according to the exemplary embodiment of the invention may be suitably used not only for forming an image of ordinary printed materials, but also for embodiments in which an image is processed after forming the same on a recording medium such as a support.

The shaped printed product according to the exemplary embodiment of the invention is a product obtained by subjecting the printed article according to the invention to a shaping process, and is produced by a method including a step of forming an image by discharging the ink composition according to the invention onto a recording medium by inkjetting; a step of obtaining a printed article having a cured image formed on the recording medium by curing the ink composition by exposing the image to actinic radiation rays; and a step of obtaining a shaped printed product by subjecting the printed article to a shaping process.

The recording medium used for producing a shaped printed product may be a recording medium formed from a resin material capable of being shaped, and examples thereof include PET, polycarbonate, polystyrene and the like.

As the processing method for preparing shaped printed products of the decorative thermoplastic resin sheet as mentioned above, vacuum molding, pressure molding or vacuum pressure molding is most preferable. The vacuum molding includes, in principle, pre-heating a planar substrate to a temperature at which the substrate may be deformed by heat, pressure-bonding the substrate to a mold while the substrate is aspirated and stretched toward the mold by reducing pressure, and cooling, whereas the pressure molding includes pressure-bonding to the mold by pressurizing from the opposite side of the mold, and cooling. In the vacuum pressure molding, the above-mentioned depressurization and pressurization are performed at the same time.

EXAMPLES

Hereinafter the invention is further specifically described by the Examples, but the invention should not be limited to the following Examples unless it exceeds the gist thereof. Unless otherwise mentioned, the "part" and "%" are based on mass.

<Preparation of Pigment Dispersions>

Pigment dispersions of respective colors (Y1, M1, C1, K1 and W1) were prepared by mixing the pigment, dispersing agent and solvent indicated below.

| Yellow pigment dispersion (Y1) | |
| --- | --- |
| Pigment: C.I. Pigment Yellow 12 | 10 parts |
| Dispersing agent: a polymer dispersing agent [SOLSPERSE 32000; trade name, manufactured by Japan Lubrizol Ltd.] | 5 parts |
| Monofunctional monomer: 2-phenoxyethyl acrylate [VISCOAT #192; trade name, manufactured by OSAKA ORGANIC CHEMICAL INDUSTRY LTD.] | 85 parts |

| Magenta pigment dispersion (M1) | |
| --- | --- |
| Pigment: C.I. Pigment Red 57:1 | 15 parts |
| Dispersing agent: a polymer dispersing agent [SOLSPERSE 32000; trade name, manufactured by Japan Lubrizol Ltd.] | 5 parts |
| Monofunctional monomer: 2-phenoxyethyl acrylate | 80 parts |

| Cyan pigment dispersion (C1) | |
| --- | --- |
| Pigment: C.I. Pigment Blue 15:3 | 20 parts |
| Dispersing agent: a polymer dispersing agent [SOLSPERSE 32000; trade name, manufactured by Japan Lubrizol Ltd.] | 5 parts |
| Monofunctional monomer: 2-phenoxyethyl acrylate | 75 parts |

| Black pigment dispersion (K1) | |
| --- | --- |
| Pigment: C.I. Pigment Black 7 | 20 parts |
| Dispersing agent: a polymer dispersing agent [SOLSPERSE 32000; trade name, manufactured by Japan Lubrizol Ltd.] | 5 parts |
| Monofunctional monomer: 2-phenoxyethyl acrylate | 75 parts |

| White pigment dispersion (W1) | |
| --- | --- |
| Pigment: MICROLITH WHITE R-A [trade name, manufactured by CIBA JAPAN Co. Ltd.] | 20 parts |
| Dispersing agent: a polymer dispersing agent [SOLSPERSE 32000; trade name, manufactured by Japan Lubrizol Ltd.] | 5 parts |
| Monofunctional monomer: 2-phenoxyethyl acrylate | 75 parts |

Preparation of Ink Composition

Example 1

Ink composition according to Example 1 was prepared by mixing the following components. In particular, the monofunctional monomer components were adjusted and mixed such that the total amount thereof, including the monofunctional monomer existing in the above pigment dispersion, corresponded to the amount (unit: parts by mass) described in Table 1.

| | |
| --- | --- |
| GENORAD 16 (trade name, manufactured by Rahn AG, polymerization inhibitor) | 0.05 parts |
| LUCIRIN TPO (trade name, manufactured by BASF Japan Ltd., photopolymerization initiator) | 6.0 parts |
| p-phenylbenzophenone (manufactured by Wako Pure Chemical Industries, Ltd., photopolymerization initiator) | 4.0 parts |
| KARENZ MT-PE1 (trade name, polyfunctional thiol compound; pentaerythritol tetrakis (3-mercaptobutylate), manufactured by Showa Denko K.K., chain transfer agent) | 2.0 parts |
| BYK 307 (trade name, manufactured by BYK Chemie, surfactant) | 0.05 parts |
| Organic crosslinked fine particles (SX866, manufactured by JSR Corporation, particle diameter: 0.3 μm, acrylic-styrene resin, solubility parameter: 47.9 (MPa)$^{1/2}$, Tg: not observed) | 10.0 parts |
| 2-phenoxydethyl acrylate (BISCOTE #192, trade name, manufactured by Osaka Organic Chemical Industry Ltd., radical polymerizable compound, monofunctional monomer) | 36.0 parts |
| N-vinylcaprolactam (V-CAP, trade name, manufactured by BASF Japan Ltd., radical polymerizable compound, monofunctional monomer) | 40.0 parts |
| RAPI-CURE DVE-3 (trade name, manufactured by ISP Europe, vinyl ether, bifunctional monomer) | 1.0 part |
| Pigment dispersion (K1) | 13.6 parts |

The particle diameter described above is a volume average particle diameter that was measured with a laser diffraction scattering-type particle size distribution analyzer (LA920, trade name, manufactured by Horiba, Ltd.) using tripropylene glycol methyl ether as a measurement solvent.

Examples 2 to 26, Comparative Examples 1 to 4

Examples 2 to 26 and Comparative Examples 1 to 4 were prepared in substantially the same manner as Example 1, except that the type and the amount of pigment dispersion, polymerizable compound and organic fine particles were changed as shown in Table 1.

The abbreviated expressions in used Table 1 refer to the following compounds.

(Polymerizable Compounds)

PEA: 2-phenoxyethyl acrylate

NVC: N-vinylcaprolactam

NVF: N-vinylformamide (BEAMSET 770, trade name, manufactured by Arakawa Chemical Industries, Ltd., radical polymerizable compound, monofunctional monomer)

EOEOEA: 2-(2-ethoxyethoxy)ethyl acrylate (LITE ACRYLATE EC-A, trade name, manufactured by Kyoeisha Chemical Co., Ltd., radical polymerizable compound, monofunctional monomer)

DVE: RAPI-CURE DVE-3

TPGDA: tripropylene glycol diacrylate (NK ESTER APG-200, trade name, manufactured by Shin-Nakamura Chemical Co., Ltd., radical polymerizable compound, bifunctional monomer)

TMP(PO)TA: trimethylol propane PO-modified triacrylate (ARONIX M-310, trade name, manufactured by Toagosei Co., Ltd., radical polymerizable compound, trifunctional monomer)

CTFA: cyclic trimethylol propane formal acrylate (SR 531, trade name, manufactured by Sartomer Japan Inc., radical polymerizable compound, monofunctional monomer)

THFA: tetrahydrofurfuryl acrylate (SR285, trade name, manufactured by Sartomer Japan Inc., radical polymerizable compound, monofunctional monomer)

(Organic Particles)

EPOSTAR: organic crosslinked fine particles (EPOSTAR S, trade name, manufactured by Nippon Shokubai Co., Ltd., particle diameter: 0.2 μm, melamine-formaldehyde resin, solubility parameter: 43.3 (MPa)$^{1/2}$, Tg: not observed)

CHEMISNOW MS 300K (CHEMISNOW MS 300K, trade name, manufactured by Soken Chemical & Engineering Co., Ltd., particle diameter: 0.1 μm, acrylic resin, solubility parameter: 40.5 (MPa)$^{1/2}$, Tg: not observed)

CHALINE: organic crosslinked fine particles (CHALINE R-170S, trade name, manufactured by Nissin Chemical Industry Co., Ltd., particle diameter: 0.2 μm, silicone acrylic copolymer resin, solubility parameter: 27.0 $(MPa)^{1/2}$, Tg: not observed)

LIOSPHERE 3021: organic crosslinked fine particles (LIOSPHERE RSP-3021D, trade name, manufactured by Toyo Ink Co., Ltd., particle diameter: 0.5 μm, acrylic resin, solubility parameter: 37.6 $(MPa)^{1/2}$, Tg: not observed)

LIOSPHERE 3015: organic crosslinked fine particles (LIOSPHERE RSP-3015D, trade name, manufactured by Toyo Ink Co., Ltd., particle diameter: 1.4 μm, acrylic resin, solubility parameter: 38.7 $(MPa)^{1/2}$, Tg: not observed)

NARPOW: organic crosslinked fine particles (NARPOW VP-108, trade name, available from Sanyo Trading Co., Ltd., SBR resin, solubility parameter: 28.2 $(MPa)^{1/2}$, Tg: not observed)

CHEMISNOW MP 2200: organic non-crosslinked fine particles (CHEMISNOW MP 2200, trade name, manufactured by Soken Chemical & Engineering Co., Ltd., particle diameter: 0.35 μm, acrylic resin, solubility parameter: 41.1 $(MPa)^{1/2}$, Tg: 98.5° C.)

Method of Determining Crosslinked Fine Particles

Whether or not the organic fine particle were crosslinked was determined by the following process. Specifically, when a glass transition temperature (Tg) was not observed in a range of from −150° C. to 300° C. as a result of carrying out the measurement twice at a temperature elevation rate of 5° C. per minute with a DSC measurement device (EXSTAR6100, trade name, manufactured by Seiko Instruments Inc.), the organic fine particles were determined to be crosslinked.

[Evaluation]

<Inkjet Image Recording (Printing)>

The prepared ink composition was filtered by using a filter having a pore size of 2 μm with absolute filtering accuracy.

Next, recording on a recording medium (a sheet of a soft polyvinyl chloride) is performed by using a commercially available inkjet recording apparatus having a piezo type inkjet nozzle. The ink supply system includes an initial tank, a supply piping, an ink supply tank immediately in front of an inkjet head, a filter, and a piezo type inkjet head. The heat insulation and heating are performed in the part from the ink supply tank to the inkjet head. The temperature sensors are respectively provided in the vicinity of the ink supply tank and the nozzle of the inkjet head to perform temperature control so that the nozzle part was always at 70° C.±2° C., by controlling a heating unit(s) according to the temperature measured by the temperature sensors. The piezo type inkjet head is driven so that multisize dots of 8 pL (picoliter) to 30 pL could be ejected with a resolution of 720×720 dpi. dpi in the present invention denotes the number of dots per 2.54 cm.

After the ink was deposited on the recording medium, a printed article was obtained by curing the image by exposing the same to ultraviolet rays with a proximity exposure apparatus having a high-pressure mercury lamp (manufactured by Hitachi High-Technologies Corporation). Specifically, ultraviolet rays were concentrated to an illuminance at exposure side of 100 mW/cm$^2$, and the exposure system, the main scanning rate and the injection frequency were adjusted so as to start the exposure 0.1 seconds after the ink was deposited on the recording medium. Further, the exposure time was variable and the exposure energy was irradiated.

The exposure energy at the recording medium was adjusted to be in a range of from 0.01 J/cm$^2$ to 15 J/cm$^2$ according to a distance between the light source and the recording medium and the delivery rate. The time for ultraviolet irradiation was determined such that the irradiation was carried out until tackiness at the image surface disappeared.

(Weight Reduction Due to Curing Ink Composition)

The ratio of the mass of the images, which were obtained by curing the ink compositions according to Examples 1 to 26 and Comparative Examples 1 to 4 by ultraviolet irradiation and drying, with respect to the mass of the ink compositions according to Examples 1 to 26 and Comparative Examples 1 to 4 before curing, was calculated. As a result, the mass ratio of the image with respect to the ink composition (before curing) was in a range of from 97 to 100 in all ink compositions, based on that a mass of the ink composition (before curing) was settled as 100.

Under the above conditions, discharge stability of the ink composition, storage stability of the ink composition, sensitivity for inhibiting blocking of an image formed by curing the ink (cured film obtained from the ink composition), punching process suitability, pencil hardness test and shaping suitability (stretchability and cracks) were evaluated. The results are shown in Table 2. The methods for the measurement and the evaluation of each item in Table 2 are as follows.

(Evaluation of Storage Stability)

After the ink compositions prepared were stored at 75% RH and 60° C. for three days, the ink viscosity was determined at the jetting temperature, and increase in the ink viscosity was determined as viscosity ratio, i.e., viscosity after storage/viscosity before storage. The viscosity ratio being closer to 1.3 indicated no change in viscosity and better storage stability, which was evaluated as A. The viscosity ratio exceeding 1.3 but 1.5 or less was evaluated as B, whereas nozzle clogging occurred at the time of jetting when an ink with the viscosity ratio exceeding 1.5 was used, which was evaluated as C.

(Evaluation of Discharge Stability)

In order to evaluate the discharge stability of the ink with head nozzles, A number of nozzle loss after carrying out continuous discharge for 60 minutes with a commercially available inkjet recording apparatus having piezo-type inkjet nozzles was evaluated under the following conditions.

In the experiment, the ink compositions according to Examples 1 to 26 and Comparative Examples 1 to 4 were discharged onto a PET support under the following conditions, and the number of nozzle loss (number of clogged nozzles) after carrying out exposure (exposure amount: 1000 mW/cm$^2$) was counted.

—Conditions—
Number of channels: 318/head
Driving frequency: 4.8 kHz/dot
Ink droplets: 7 drops, 42 pL
Temperature: 45° C.
—Evaluation Criteria—
A: nozzle loss 0 or more and lower than 5
B: nozzle loss 5 or more and lower than 10
C: nozzle loss 10 or more (Evaluation of Sensitivity for Inhibiting Blocking)

On the image after being exposed, five hundred PET sheets (same size as the soft polyvinyl chloride sheet on which the image was formed both in width and length, weight: 2 g/sheet) were stacked and allowed to stand for one day. Thereafter, transfer of the image to the PET sheet was visually observed. If the transfer was not easily observed, the result was over the acceptance line, and if the transfer was easily observed, the result was below the acceptance line. The amount of exposure energy (mJ/cm$^2$) that was necessary for the result to reach the acceptance line was defined as the sensitivity for inhibiting blocking (which is in some case referred as blocking sensitivity).

The acceptable range of the blocking sensitivity is 12,000 mJ/cm² or less, preferably 6,000 mJ/cm² or less.

(Pencil Hardness Test)

The printed image (cured film formed from the ink composition) was subjected to a pencil hardness test based on JIS K5600. The acceptable range of the hardness in radical polymerizable inks having stretchability is HB or higher, preferably H or higher.

(Evaluation of Stretchability)

Printed articles for evaluation of stretchability were prepared in substantially the same manner as the printed articles of Examples 1 to 26 and Comparative Examples 1 to 4, except that the recording medium (soft polyvinyl chloride sheet) was changed to FASSON PE (trade name, a polyethylene film manufactured by Avery Dennison Japan K.K., thickness: 100 µm) and that the ultraviolet exposure with a high-pressure mercury lamp after inkjet image recording was carried out at an accumulated exposure amount of 12,000 mJ/cm² and at an illuminance of 2,140 mW/cm².

The obtained printed articles for evaluation of stretchability were cut into a size of 5 cm in axial length×2.5 cm in width. The cut cured film was stretched at a rate of 30 cm/min and the degree of elongation at which the cured film fractured was measured. The degree of elongation at which the cured film was stretched to a length twice the initial length was defined as 100%. The acceptable range of the elongation is 200% or more, preferably 300% or more.

(Evaluation of Vacuum Shaping)

The printed articles for evaluation of elongation were subjected to a shaping process according to the following method, and the obtained shaped printed product was observed and the processing suitability was evaluated.

Printed articles obtained by using a polycarbonate sheet (manufactured by Teijin Chemicals Ltd.) instead of the support used for the evaluation of stretchability were subjected to vacuum shaping with a vacuum forming apparatus (FORMING 300X, trade name, manufactured by Seikosangyo Co., Ltd.) A wooden mold shown in FIG. 1 was placed at the center of a vacuum table of the vacuum forming apparatus, and the temperature of the heater was set such that the temperature of the recording medium (support) was 170° C. After heating the recording medium to 170° C., vacuum shaping was performed while slowly elevating the vacuum table on which the wooden mold was placed by operating a table elevating lever. The formed shaped printed product was visually observed to see whether or not clacking or white spot occurred, and the result was evaluated in accordance with the following criteria.

—Evaluation Criteria—

A: Cracking or white spot was not observed.

B: A slight degree of cracking or white spot was observed.

C: A significant degree of cracking or white spot was observed, and vacuum shaping could not carried out.

(Evaluation of Punching Process Suitability)

The punching process suitability was evaluated using the same samples as that used in the evaluation for vacuum shaping. Specifically, the samples were punched by hitting a punch (diameter: 10 mm) with a hammer, and the results were evaluated in accordance with the following evaluation criteria.

—Evaluation Criteria—

A: Substantially no cracks were observed at the periphery of the hole even with an observation with an optical microscope.

B: A slight degree of visually unnoticeable cracks were observed at the periphery of the hole.

C: Visually noticeable cracks were observed at the periphery of the hole.

TABLE 1

| | Pig. Disp. | Polymerizable Monomer (Kind and Amount: parts) | | | | | | | | | Total (parts) | RMM (%) | Organic Fine Particles | | | |
|---|---|---|---|---|---|---|---|---|---|---|---|---|---|---|---|---|
| | | Mono Functional Monomer | | | | | | 2F Monomer | | 3FM | | | | PD | Ad | |
| | | PEA | NVC | NVF | EOEOFA | CTFA | THFA | DVE | TPGDA | TMPA | | | Kind | (µm) | Amt | SP |
| Ex. 1 | K1 | 36 | 40 | — | — | — | — | 1 | — | — | 77 | 98.7 | SX866 | 0.3 | 10 | 47.9 |
| Ex. 2 | M1 | 36 | 40 | — | — | — | — | 1 | — | — | 77 | 98.7 | SX866 | 0.3 | 10 | 47.9 |
| Ex. 3 | C1 | 36 | 40 | — | — | — | — | 1 | — | — | 77 | 98.7 | SX866 | 0.3 | 10 | 47.9 |
| Ex. 4 | Y1 | 36 | 40 | — | — | — | — | 1 | — | — | 77 | 98.7 | SX866 | 0.3 | 10 | 47.9 |
| Ex. 5 | W1 | 36 | 40 | — | — | — | — | 1 | — | — | 77 | 98.7 | SX866 | 0.3 | 10 | 47.9 |
| Ex. 6 | K1 | 20 | 20 | 20 | 16 | — | — | — | — | 1 | 77 | 98.7 | EPOSTAR | 0.2 | 10 | 43.3 |
| Ex. 7 | K1 | 20 | 20 | 20 | 16 | — | — | — | — | 1 | 77 | 98.7 | CHEMISNOW MS | 0.1 | 10 | 40.5 |
| Ex. 8 | K1 | 20 | 20 | 20 | 16 | — | — | — | — | 1 | 77 | 98.7 | CHALINE | 0.2 | 10 | 27 |
| Ex. 9 | K1 | 20 | 20 | 20 | 16 | — | — | — | — | 1 | 77 | 98.7 | LIOSPHERE 3021 | 0.5 | 10 | 37.6 |
| Ex. 10 | K1 | 20 | 20 | 20 | 16 | — | — | — | — | 1 | 77 | 98.7 | SX866 | 0.3 | 10 | 47.9 |
| Ex. 11 | K1 | 20 | 20 | 20 | 16 | — | — | — | 1 | — | 77 | 98.7 | SX866 | 0.3 | 10 | 47.9 |
| Ex. 12 | K1 | 20 | 20 | 20 | 15 | — | — | — | 2 | — | 77 | 97.4 | SX866 | 0.3 | 10 | 47.9 |
| Ex. 13 | K1 | 20 | 20 | 20 | 12 | — | — | — | 5 | — | 77 | 93.5 | SX866 | 0.3 | 10 | 47.9 |
| Ex. 14 | K1 | 20 | 20 | 20 | 16 | — | — | — | — | 1 | 77 | 98.7 | SX866 | 0.3 | 2 | 47.9 |
| Ex. 15 | K1 | 20 | 20 | 20 | 16 | — | — | — | — | 1 | 77 | 98.7 | SX866 | 0.3 | 4 | 47.9 |
| Ex. 16 | K1 | 20 | 20 | 20 | 16 | — | — | — | — | 1 | 77 | 98.7 | SX866 | 0.3 | 8 | 47.9 |
| Ex. 17 | K1 | 20 | 20 | 20 | 16 | — | — | — | — | 1 | 77 | 98.7 | SX866 | 0.3 | 20 | 47.9 |
| Ex. 18 | K1 | 20 | 20 | 20 | 16 | — | — | — | — | 1 | 77 | 98.7 | SX866 | 0.3 | 25 | 47.9 |

TABLE 1-continued

| | Pig. Disp. | Polymerizable Monomer (Kind and Amount: parts) | | | | | | | | | Total (parts) | RMM (%) | Organic Fine Particles | | | |
|---|---|---|---|---|---|---|---|---|---|---|---|---|---|---|---|---|
| | | Mono Functional Monomer | | | | | | 2F Monomer | | 3FM | | | | | | |
| | | PEA | NVC | NVF | EOEOFA | CTFA | THFA | DVE | TPGDA | TMPA | | | Kind | PD (μm) | Ad Amt | SP |
| Ex. 19 | K1 | 20 | 20 | 20 | 16 | — | — | — | 1 | — | 77 | 98.7 | SX866 | 0.3 | 10 | 47.9 |
| Ex. 20 | K1 | 37 | 40 | — | — | — | — | — | — | — | 77 | 100 | SX866 | 0.3 | 10 | 47.9 |
| Ex. 21 | K1 | 20 | 20 | 20 | 16 | — | — | — | — | 1 | 77 | 98.7 | LIOSPHERE 3015 | 1.4 | 10 | 38.7 |
| Ex. 22 | K1 | 36 | 40 | — | — | — | — | 1 | — | — | 77 | 98.7 | NARPOW | 0.1 | 10 | 28.2 |
| Ex. 23 | K1 | — | 28 | — | — | — | 48 | 1 | — | — | 77 | 98.7 | SX866 | 0.3 | 10 | 47.9 |
| Ex. 24 | K1 | — | 28 | — | — | 15 | 33 | 1 | — | — | 77 | 98.7 | SX866 | 0.3 | 10 | 47.9 |
| Ex. 25 | K1 | — | 20 | 10 | 20 | 26 | — | 1 | — | — | 77 | 98.7 | SX866 | 0.3 | 10 | 47.9 |
| Ex. 26 | K1 | — | 15 | 25 | 9 | 18 | 9 | 1 | — | — | 77 | 98.7 | SX866 | 0.3 | 10 | 47.9 |
| CEx. 1 | K1 | 36 | 40 | — | — | — | — | 1 | — | — | 77 | 98.7 | — | — | 0 | — |
| CEx. 2 | K1 | 20 | 20 | 20 | 8 | — | — | — | — | — | 77 | 88.3 | SX866 | 0.3 | 10 | 47.9 |
| CEx. 3 | K1 | 15 | 20 | 20 | 7 | — | — | — | — | — | 77 | 80.5 | SX866 | 0.3 | 10 | 41.1 |
| CEx. 4 | K1 | 36 | 40 | — | — | — | — | 1 | — | — | 77 | 98.7 | CHEMISNOW MP | 0.35 | 10 | 47.9 |

TABLE 2

| | Ink | | | Shaping Suitability | | Punching | Pencil |
|---|---|---|---|---|---|---|---|
| | Ink Storage Stability | Discharge Stability | Blocking Sensitivity | Elongation (%) | Clacking | Process Suitability | Hardness Test |
| Example 1 | A | A | 8000 | 320 | A | A | 2H |
| Example 2 | A | A | 8000 | 320 | A | A | 2H |
| Example 3 | A | A | 8000 | 320 | A | A | 2H |
| Example 4 | A | A | 8000 | 320 | A | A | 2H |
| Example 5 | A | A | 7000 | 320 | A | A | 2H |
| Example 6 | A | A | 7000 | 320 | A | A | 2H |
| Example 7 | A | A | 8000 | 320 | A | A | 2H |
| Example 8 | A | A | 7000 | 320 | A | A | H |
| Example 9 | A | A | 7000 | 320 | A | A | H |
| Example 10 | A | A | 7000 | 320 | A | A | 2H |
| Example 11 | A | A | 8000 | 320 | A | A | 2H |
| Example 12 | A | A | 8000 | 320 | A | A | 2H |
| Example 13 | A | A | 6000 | 200 | A | B | 2H |
| Example 14 | A | A | 8000 | 270 | A | A | HB |
| Example 15 | A | A | 8000 | 340 | A | A | HB |
| Example 16 | A | A | 8000 | 300 | A | A | H |
| Example 17 | A | A | 8000 | 290 | A | A | 2H |
| Example 18 | A | B | 8000 | 290 | A | A | 2H |
| Example 19 | A | A | 7000 | 220 | A | A | 2H |
| Example 20 | A | A | 9000 | 320 | A | A | H |
| Example 21 | A | B | 8000 | 270 | A | A | 2H |
| Example 22 | A | A | 7000 | 270 | A | A | HB |
| Example 23 | A | A | 7000 | 300 | A | A | H |
| Example 24 | A | A | 6000 | 360 | A | A | 2H |
| Example 25 | A | A | 6000 | 300 | A | A | 2H |
| Example 26 | A | A | 7000 | 360 | A | A | 2H |
| Comparative Example 1 | A | A | 18000 | 320 | A | A | 2B |
| Comparative Example 2 | A | A | 6000 | 130 | C | C | 2H |
| Comparative Example 3 | A | A | 6000 | 60 | C | C | 2H |
| Comparative Example 4 | C | C | 8000 | 270 | C | C | H |

In Table 1, the abbreviation "Ex." denotes "Example number", the abbreviation "CEx." denotes "Comparative Example number", the abbreviation "Pig. Disp." denotes "Pigment dispersion", the abbreviation "2F Monomer" denotes "Bifunctional monomer", the abbreviation "3F M" denotes "Trifunctional monomer", the abbreviation "TMPA" denotes "TMP(PO)TA", the abbreviation "RMM" denotes "Ratio of monofunctional monomer", the abbreviation "PD" denotes "Particle diameter", the abbreviation "Ad Amt" denotes "Added amount", the abbreviation "SP" denotes "Solubility parameter", "CHEMISNOW MS" denotes "CHEMISNOW MS-300K", "CHEMISNOW MP" denotes "CHEMISNOW MP-2200", and the values in the column "polymerizable monomer" refer to the contents of respective monomers (parts by mass) shown in Table 1. Further, the "monofunctional ratio" refers to a content ratio (% by mass) of the total amount of the monofunctional monomer with respect to the total amount of the polymerizable monomer. The unit of the values in the column "blocking sensitivity" is "mJ/cm$^2$" and the unit of the values in the column "stretchability" is "%".

As shown in Table 2, the ink compositions of the Examples according to the invention exhibit superior sensitivity for inhibiting blocking, and are capable of forming a printed image that exhibits favorable shaping suitability and punching suitability at the same time, as compared with the ink compositions of the Comparative Examples.

Moreover, the ink compositions according to the invention exhibit excellent storage suitability and discharge stability, and are capable of forming a printed image that exhibits favorable pencil hardness.

The foregoing description of the exemplary embodiments of the present invention has been provided for the purposes of illustration and description. It is not intended to be exhaustive or to limit the invention to the precise forms disclosed. The embodiments were chosen and described in order to best explain the principles of the invention and its practical applications, thereby enabling others skilled in the art to understand the invention for various embodiments and with the various modifications as are suited to the particular use contemplated.

All publications, patent applications, and technical standards mentioned in this specification are herein incorporated by reference to the same extent as if such individual publication, patent application, or technical standard was specifically and individually indicated to be incorporated by reference. It will be obvious to those having skill in the art that many changes may be made in the above-described details of the preferred embodiments of the present invention. It is intended that the scope of the invention be defined by the following claims and their equivalents.

What is claimed is:

1. An actinic ray curable ink composition for inkjet recording comprising:
    a colorant;
    a polymerization initiator;
    a polymerizable monomer comprising a monofunctional monomer in an amount of 90% by mass or more with respect to a total mass of the polymerizable monomer; and
    organic fine particles that are crosslinked,
    wherein the organic fine particles are free from a radical polymerizable group, and
    the organic fine particles have a network structure in which polymers are bonded to each other in a three-dimensional form.

2. The ink composition according to claim 1, wherein a solubility parameter of the organic fine particles is in a range of from 30 to 50 (MPa)$^{1/2}$.

3. The ink composition according to claim 1, wherein the organic fine particles comprise at least one resin selected from the group consisting of an acrylic resin, an acrylic-styrene resin, an epoxy resin, a urethane resin and a polyamide resin.

4. The ink composition according to claim 1, wherein the organic fine particles have a volume average particle diameter in a range of from 0.01 μm to 3 μm.

5. The ink composition according to claim 1, wherein a content of the polymerizable monomer is 50% by mass or more with respect to a total mass of the ink composition.

6. The ink composition according to claim 1, wherein the polymerizable monomer comprises a monofunctional monomer and a polyfunctional monomer, and a mass ratio of the monofunctional monomer to the polyfunctional monomer (monofunctional monomer:polyfunctional monomer) is in a range of from 90:10 to 99.9:0.1.

7. The ink composition according to claim 1, wherein the monofunctional monomer is a radical polymerizable monomer.

8. The ink composition according to claim 7, wherein the radical polymerizable monomer comprises an acrylate compound and a N-vinyl compound.

9. The ink composition according to claim 7, wherein the radical polymerizable monomer comprises an acrylate having a cyclic structure in a molecule thereof.

10. The ink composition according to claim 1, further comprising a chain transfer agent.

11. The ink composition according to claim 10, wherein the chain transfer agent is a polyfunctional thiol compound having a secondary thiol group or a tertiary thiol group.

12. The ink composition according to claim 1, wherein a mass ratio of a mass of the ink composition before curing to a mass of an image obtained by curing the ink composition by actinic rays and drying (mass of the ink composition before curing:mass of the image obtained after curing) is in a range of from 100:95 to 100:100.

13. The ink composition according to claim 1, wherein a content of water is 3% by mass or less with respect to a total mass of the ink composition.

14. The ink composition according to claim 1, wherein the ink composition substantially contains no solvent other than the polymerizable monomer.

15. A method for forming a printed article comprising:
    forming an image by ejecting, onto a recording medium, the actinic ray curable ink composition for inkjet recording according to claim 1, and
    forming a printed article having a cured image on the recording medium by irradiation of the actinic ray onto the image so that the ink composition in the image is cured.

16. The ink composition according to claim 1, wherein a content of the organic fine particles is in a range of from 8 to 20% by mass with respect to a total mass of the ink composition.

* * * * *